(12) United States Patent
Rockafellow et al.

(10) Patent No.: US 8,434,811 B2
(45) Date of Patent: May 7, 2013

(54) CHANNEL FOR SLIDE-ON-ROD VISORS

(75) Inventors: Brent D. Rockafellow, Holland, MI (US); Thomas S. Hodgson, Holland, MI (US); Stacy G. Frye, Holland, MI (US); Bryan T. Jones, Holland, MI (US); Philip A. Lehman, West Olive, MI (US); Kenneth D. Kreuze, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 13/123,430

(22) PCT Filed: Oct. 15, 2009

(86) PCT No.: PCT/US2009/060815
§ 371 (c)(1),
(2), (4) Date: May 11, 2011

(87) PCT Pub. No.: WO2010/045438
PCT Pub. Date: Apr. 22, 2010

(65) Prior Publication Data
US 2011/0227362 A1    Sep. 22, 2011

Related U.S. Application Data

(60) Provisional application No. 61/105,686, filed on Oct. 15, 2008, provisional application No. 61/110,154, filed on Oct. 31, 2008.

(51) Int. Cl.
*B60J 3/02* (2006.01)

(52) U.S. Cl.
USPC .................................................. 296/97.11

(58) Field of Classification Search ............. 296/97.11
See application file for complete search history.

(56) References Cited

U.S. PATENT DOCUMENTS

| | | | |
|---|---|---|---|
| 5,484,183 A | 1/1996 | Rosa | |
| 6,435,593 B2 * | 8/2002 | Welter | 296/97.5 |
| 6,698,814 B1 * | 3/2004 | Mills et al. | 296/97.11 |
| 6,840,561 B2 * | 1/2005 | Mills et al. | 296/97.1 |
| 6,923,490 B2 * | 8/2005 | Peterson et al. | 296/97.11 |
| 7,032,949 B1 | 4/2006 | Wang et al. | |
| 7,798,551 B2 * | 9/2010 | Okazaki et al. | 296/97.11 |
| 2004/0000062 A1 | 1/2004 | Hansen et al. | |
| 2004/0066056 A1 | 4/2004 | Mills et al. | |

FOREIGN PATENT DOCUMENTS

| | | |
|---|---|---|
| WO | 2004/030959 A2 | 4/2004 |
| WO | 2010/045438 A1 | 4/2010 |

OTHER PUBLICATIONS

International Search Report & Written Opinion dated Dec. 21, 2009.
International Preliminary Report on Patentability dated Apr. 28, 2011.

* cited by examiner

*Primary Examiner* — Dennis Pedder
(74) *Attorney, Agent, or Firm* — Michael Best & Friedrich LLP

(57) ABSTRACT

This invention relates to a vehicle visor, comprising a visor pivot rod, a carrier on the visor pivot rod, a spring mechanism inside the carrier, and an open channel with a first end and a second end, wherein at least a portion of the carrier extends into the interior.

17 Claims, 13 Drawing Sheets

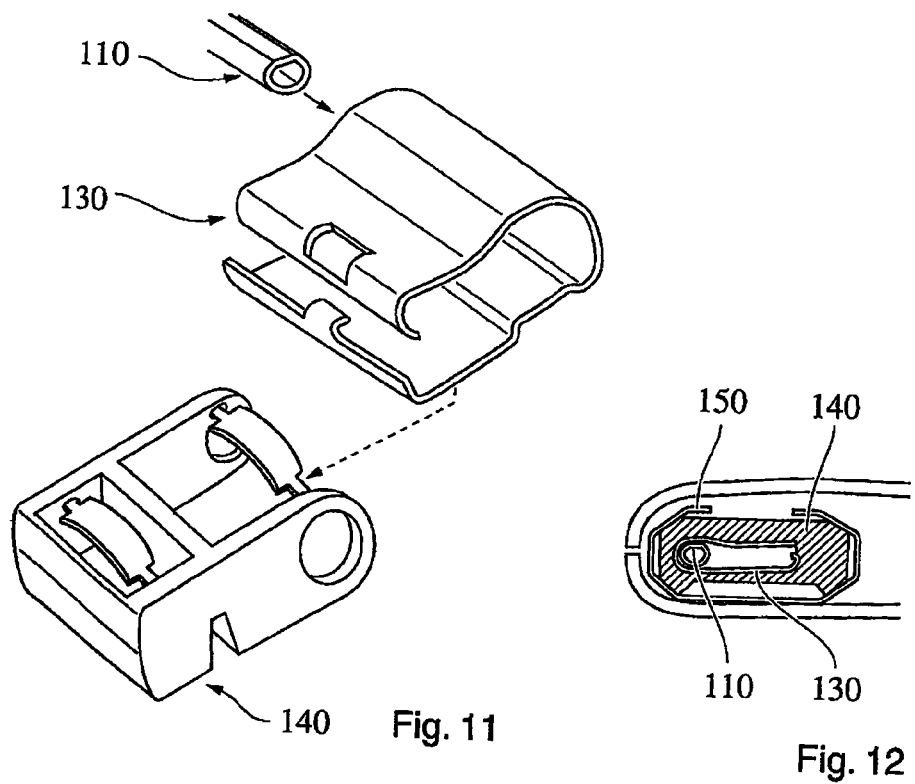
Fig. 11
Fig. 12
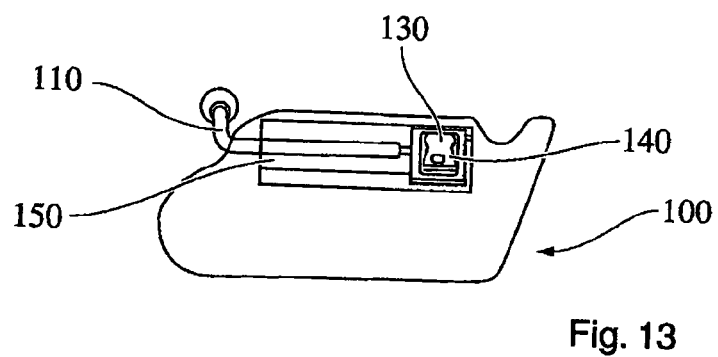
Fig. 13

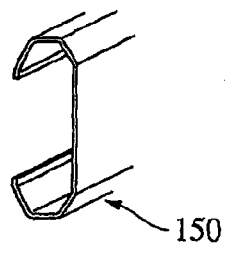
Fig. 14
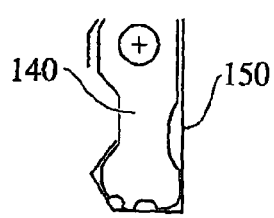
Fig. 15
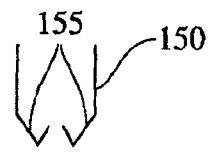
Fig. 16
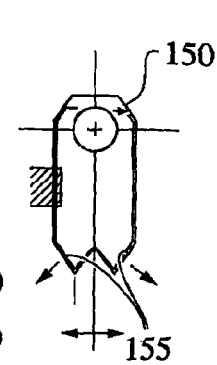
Fig. 17
Fig. 18
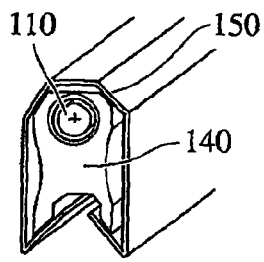
Fig. 19
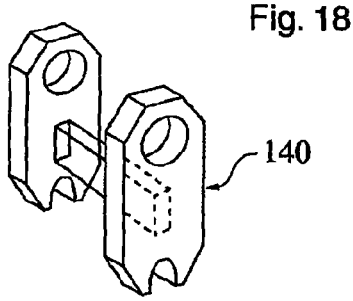
Fig. 20
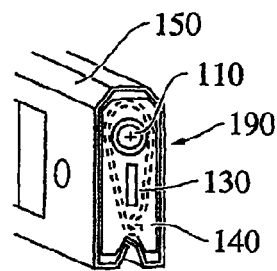
Fig. 21
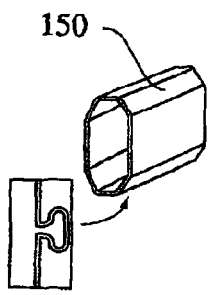
Fig. 22
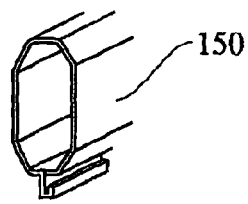
Fig. 23

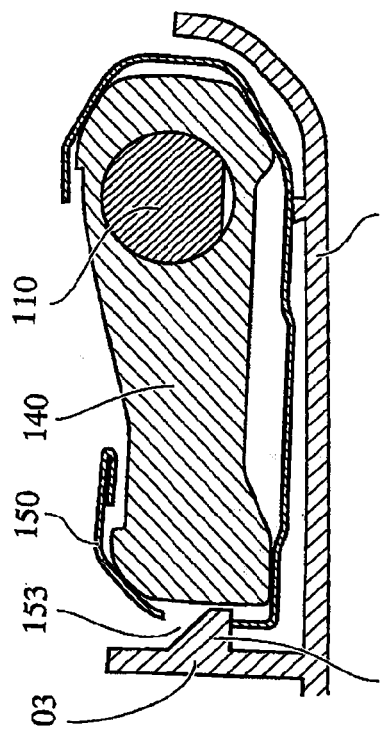
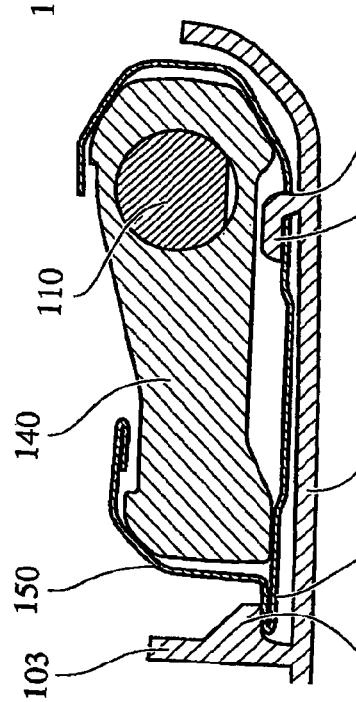
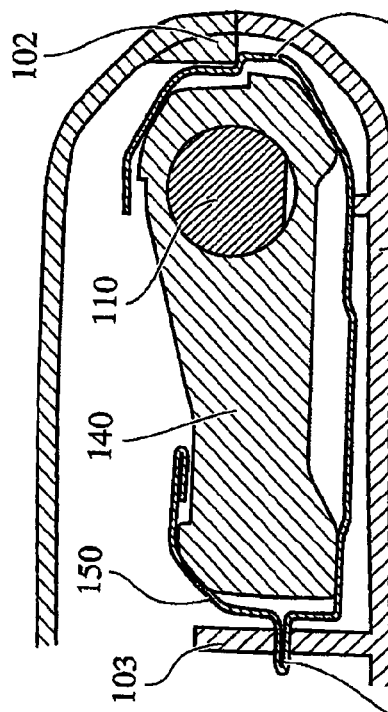
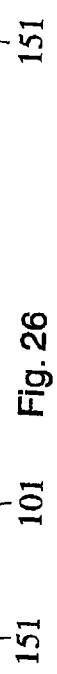

CHANNEL FOR SLIDE-ON-ROD VISORS

CLAIM OF PRIORITY

This application claims priority from provisional application Ser. No. 61/105,686 filed 15 Oct. 2008, from provisional application Ser. No. 61/110,154, filed on 31 Oct. 2008, and from PCT Application International Application PCT/US2009/060815, filed 15 Oct. 2009 (published as WO2010/045438), all incorporated herein by reference.

BACKGROUND

1. Field of the Invention

This invention relates to a vehicle sun visor assembly having moveable coverage.

2. Related Art

It is known to provide a sun visor in vehicles that is capable of rotating between up and down positions. Visors typically are mounted to a vehicle by an elbow mounting bracket which couples one end of a visor pivot rod to the vehicle. Visors include a visor body, with the other end of the visor pivot rod extending into the visor body. A torque fitting extends between the visor body and the visor pivot rod to allow the visor to rotate on the visor pivot rod from a stored position adjacent the vehicle headliner to various adjusted lowered on use positions. The elbow bracket allows the visor to be pivoted to a side window position for blocking incoming sunlight from the side of the vehicle. A visor of this type can block glare coming through the driver's side window and a small portion of the front window, but not from all directions in the driver's vision.

To improve coverage, visors that slide along the pivot rod, called slide-on-rod ("SOR") visors, have been proposed. Current SOR visors use a closed, D-shaped channel or 2-piece channels into which the visor pivot rod, a carrier (e.g., a plastic guide), and detent spring are inserted and along which the visor pivot rod slides. The D-shaped channel is manufactured as an extruded aluminum component, an expensive process. The "D" shape of the channel, and stiff wall section, makes it difficult to obtain optimal resistance to movement, which is either too high or too low due to the tolerances required. A loose fit of the channel over the carrier leads to undesirable noise from vehicle-induced vibrations in the visor. The loose fit can also fail to provide sufficient resistance to movements, and thus fail to hold the visor in place.

SUMMARY

This invention relates to a vehicle visor, comprising a visor pivot rod, a carrier on the visor pivot rod, a spring mechanism inside the carrier, and an open channel with a first end and a second end, wherein at least a portion of the carrier extends into the interior
of the open channel, and the carrier slides along the open channel. The vehicle visor comprises a channel and the carrier slides along the channel. Preferably, the spring mechanism comprises a detent spring assembly, which provides a compressive force on the pivot rod. Preferably, the detent spring rotates or pivots relative to pivot rod. Preferably, the carrier flexes the inside of the channel. Preferably, wires pass through the hollow rod and exit through the side of the open channel, reducing the amount of wire required. Preferably end stops for the SOR-movement of the carrier are provided, more preferably inside the channel. Even more preferably, the end-stops are the end caps, which are most preferably, rigidly connected to the channel. In a preferred embodiment of the present invention, the surface of the end caps provide a datum surface for the movement of the carrier. In yet another preferred embodiment of the present invention, the vehicle visor comprises a visor core, which has two parts, which are connected, preferably sealed together. In a preferred embodiment, the pivot rod, the channel, wire and/or the end cap are held in place by the visor core after the parts have been connected. Especially, in cases where the channel is open, preferably at least one of the edges of the channel is hemmed, preferably formed back over itself and/or rounded in order to avoid sharp edges in contact with the carrier. In yet another preferred embodiment, the carrier has a slot that fits over the hemmed or rounded edge of the channel. Another object of the present invention is a vehicle visor, comprising a solid or hollow visor pivot rod, a carrier fitting to the visor pivot rod and a spring mechanism, wherein the spring mechanism is at least partially in the carrier.

These and other features and advantages of various exemplary embodiments of systems and methods according to this invention are described in, or are apparent from, the following detailed descriptions of various exemplary embodiments of various devices, structures and/or methods according to this invention.

BRIEF DESCRIPTION OF THE DRAWINGS

Various exemplary embodiments of the systems and methods according to the present disclosure will be described in detail, with reference to the following figures, wherein:

FIG. 11 is an exploded view of an exemplary embodiment of a pivot rod, detent spring, and carrier according to this invention;

FIG. 12 is a partial cross-sectional view of an exemplary embodiment of a visor according to an exemplary embodiment of this invention;

FIG. 13 is a schematic view of an exemplary embodiment of a visor according to a first exemplary embodiment according to this invention;

FIG. 14 is a partial perspective end view of an exemplary embodiment of a channel according to a first exemplary embodiment according to this invention;

FIG. 15 is an end view of an exemplary embodiment of a channel and carrier according to a second exemplary embodiment according to this invention;

FIG. 16 is a partial end view of an exemplary embodiment of a channel according to a third exemplary embodiment according to this invention;

FIG. 17 is an end view of an exemplary embodiment of a channel according to a fourth exemplary embodiment according to this invention;

FIG. 18 is an end view of an exemplary embodiment of a channel and carrier according to fifth exemplary embodiment according to this invention;

FIG. 19 is a perspective end view of an exemplary embodiment of a channel and carrier according to a sixth exemplary embodiment according to this invention;

FIG. 20 is a perspective view of an exemplary embodiment of a carrier according to an exemplary embodiment according to this invention;

FIG. 21 is a perspective end view of an exemplary embodiment of a channel and carrier assembly according to an exemplary embodiment according to this invention;

FIG. 22 is a partial perspective view of a first exemplary embodiment of a closed channel according to this invention;

FIG. 23 is a partial perspective view of a second exemplary embodiment of a closed channel according to this invention;

FIG. 25 is a partial cross-sectional end view of an exemplary embodiment of a pivot rod, carrier, and visor assembly according to a second exemplary embodiment according to this invention;

FIG. 26 is a partial cross-sectional end view of an exemplary embodiment of a pivot rod, carrier, and visor assembly according to a third exemplary embodiment according to this invention;

FIG. 27 is a partial cross-sectional end view of an exemplary embodiment of a pivot rod, carrier, and visor assembly according to a fourth exemplary embodiment according to this invention;

FIG. 28 is a partial cross-sectional end view of an exemplary embodiment of a pivot rod, carrier, and visor assembly according to a fifth exemplary embodiment according to this invention;

DETAILED DESCRIPTION

This invention relates to a sliding sun visor for a vehicle. The disclosed designs provide a stamped or roll-formed channel that is less expensive to produce than prior art extruded aluminum channels. The disclosed sliding visor includes a carrier assembly attached to the pivot rod. The carrier assembly is fitted to a channel in the visor body. The carrier assembly slides along the channel, which allows the user to position the visor in a wider range of locations.

Figure 1:
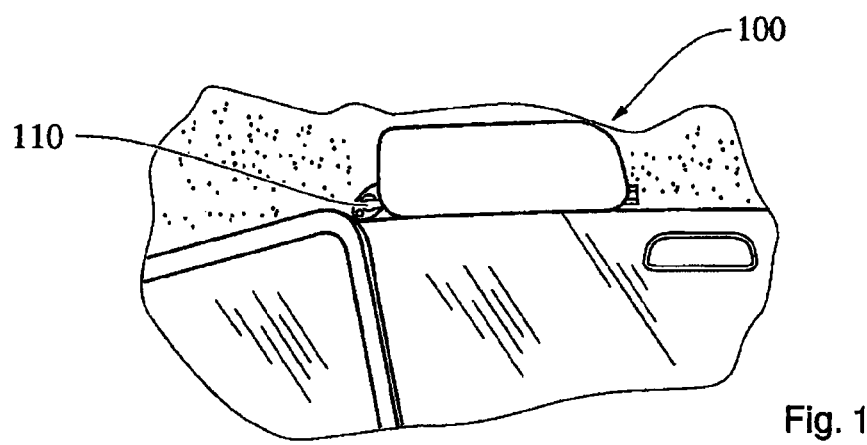
FIG. 1 is a fragmentary perspective view of a vehicle including a visor.
Figure 2:
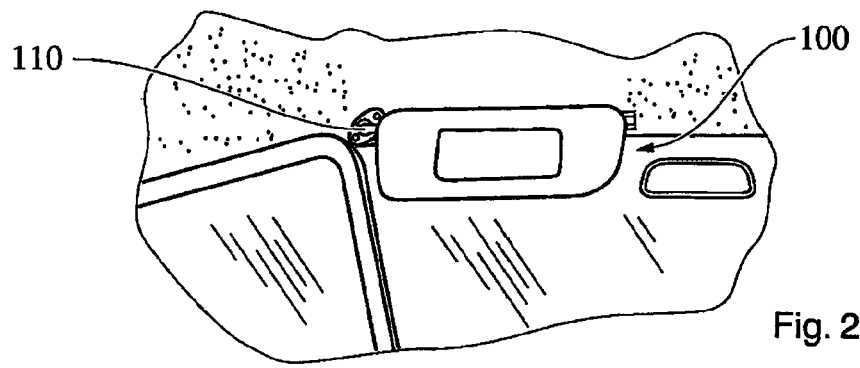
FIG. 2 is a second fragmentary perspective view of the vehicle and the visor.
Figure 3:
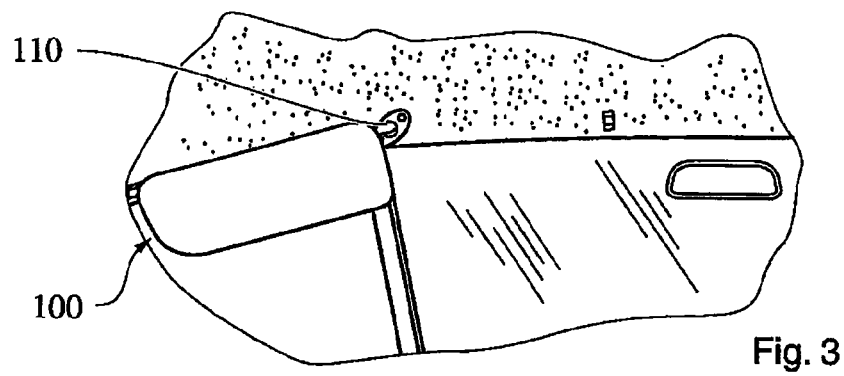
FIG. 3 is a third fragmentary perspective view of the vehicle and the visor.

FIG. 1 shows an exemplary embodiment of a visor 100 in a detent or stowed position. FIG. 2 shows the visor 100 of FIG. 1 rotated on a pivot rod 110 to a downturned or in use position. FIG. 3 shows the visor 100 of FIG. 1 in an in use position at the side window.

Figure 4:
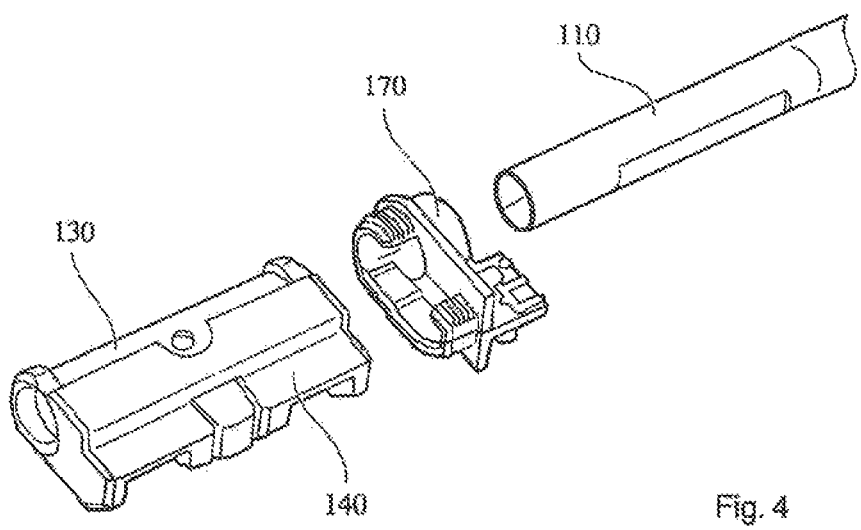
FIG. 4 is a perspective schematic view of exemplary embodiments of a pivot rod, outer end cap, and detent spring assembly according to this invention.
Figure 5:
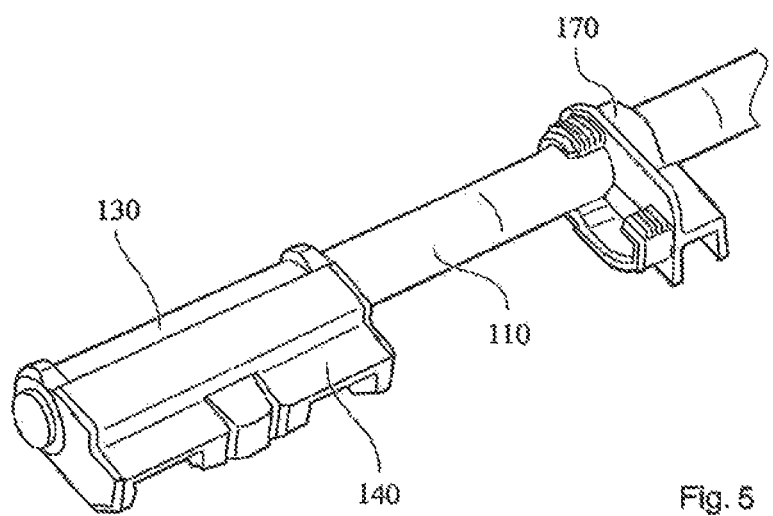
FIG. 5 is a perspective view of the embodiments of FIG. 4 assembled together.
Figure 6:
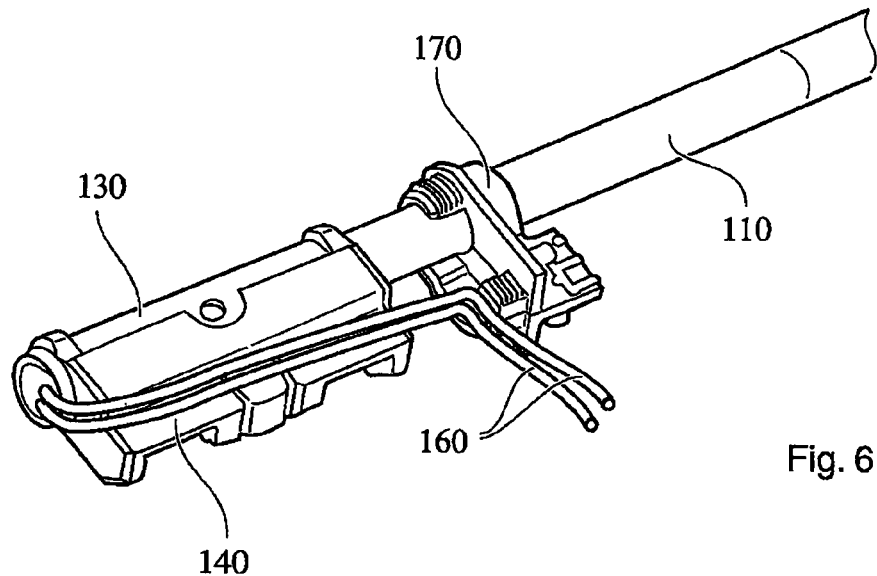
FIG. 6 is a perspective view of the embodiment of FIG. 5 with two wires extending through and from the pivot rod.
Figure 24:
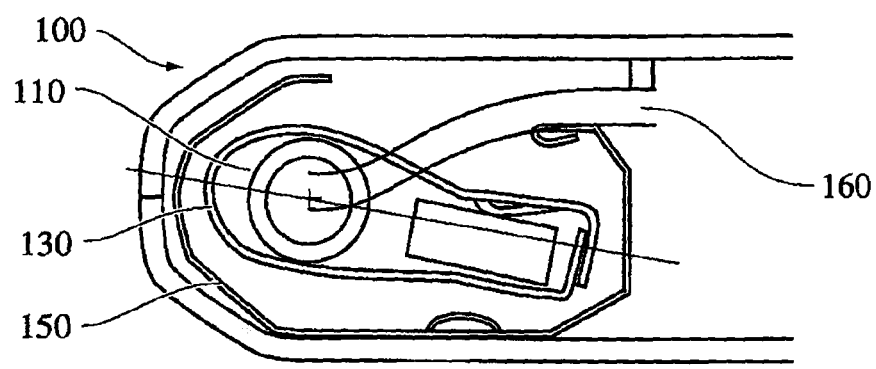
FIG. 24 is a partial end cross-sectional view of an exemplary embodiment of a pivot rod, carrier, channel and visor assembly with an electrical wire according to a first exemplary embodiment according to this invention.

FIGS. 4 and 5 show an embodiment of a pivot rod 110, outside end cap 170, detent spring assembly 130, carrier 140, and spring loaded button 120. As shown in FIG. 5, the pivot rod 110 passes through the outside end cap 170 and engages the detent spring assembly 130. In various exemplary embodiments, as illustrated by FIG. 24, one or more wires 160 pass through and out of pivot rod 110. The one or more wires 160 exit the through the open channel 150 and provide a shorter electrical connection to components on the visor, such as, a vanity light.

Figure 7:
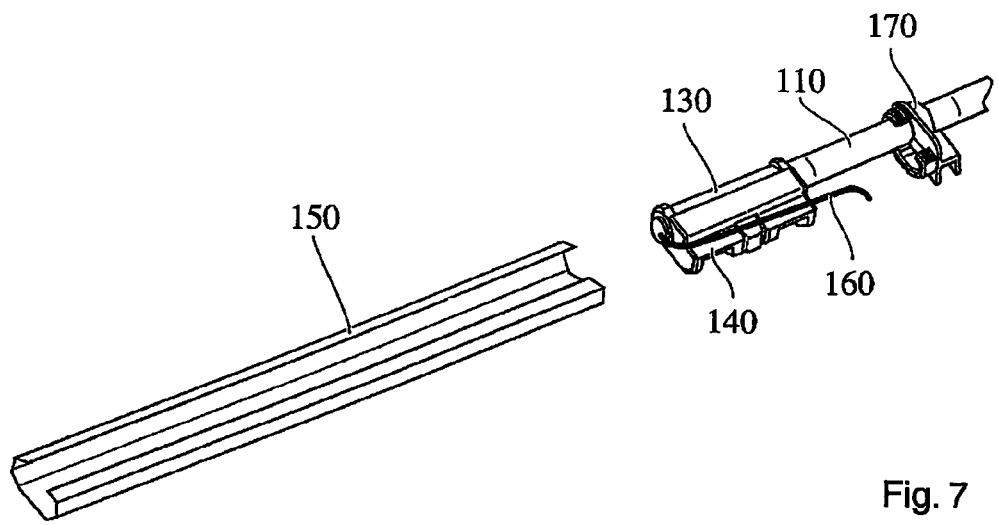
FIG. 7 is a perspective schematic view of embodiment of FIG. 5 with an exemplary embodiment of an open channel according to this invention.
Figure 8:
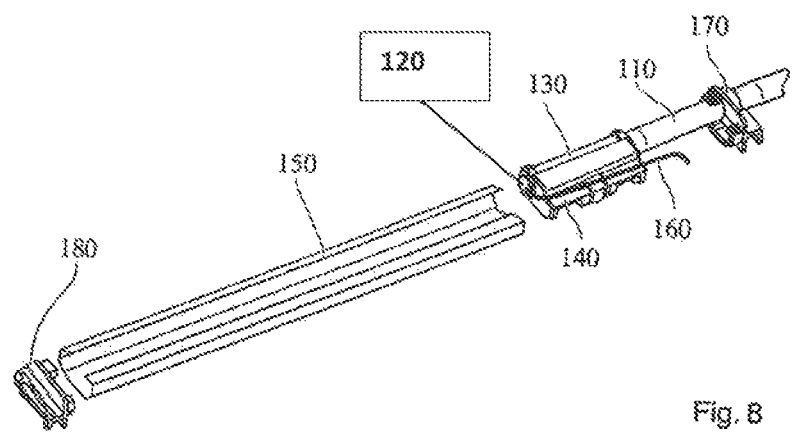
FIG. 8 is a perspective schematic view of embodiment of FIG. 5 with an exemplary embodiment of an open channel and an inner end cap according to this invention.
Figure 9:
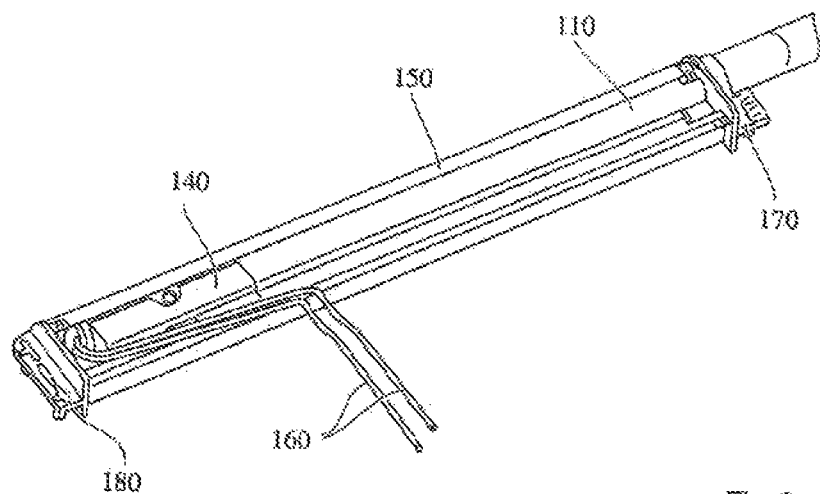
FIG. 9 is a perspective view of an exemplary embodiment of an assembled slide-on-rod mechanism according to this invention.

FIGS. 7 and 8 show the assembly of FIG. 24 and an exemplary embodiment of an open channel 150 and inside end cap 180. As shown in FIG. 27, the detent spring slides into and along the channel. As shown in FIG. 8, the spring loaded button 120 engages channel 150 providing slide resistance. The inside end cap 180 and outside end cap 170 engage the channel at opposite ends. In various exemplary embodiments, the inside end cap 180 and outside end cap 170 are engaged in the channel 150 with a friction fit. An open channel 150 allows the one or more wires 160 ingress and/or egress to the channel at any point along its length.

Figure 10:
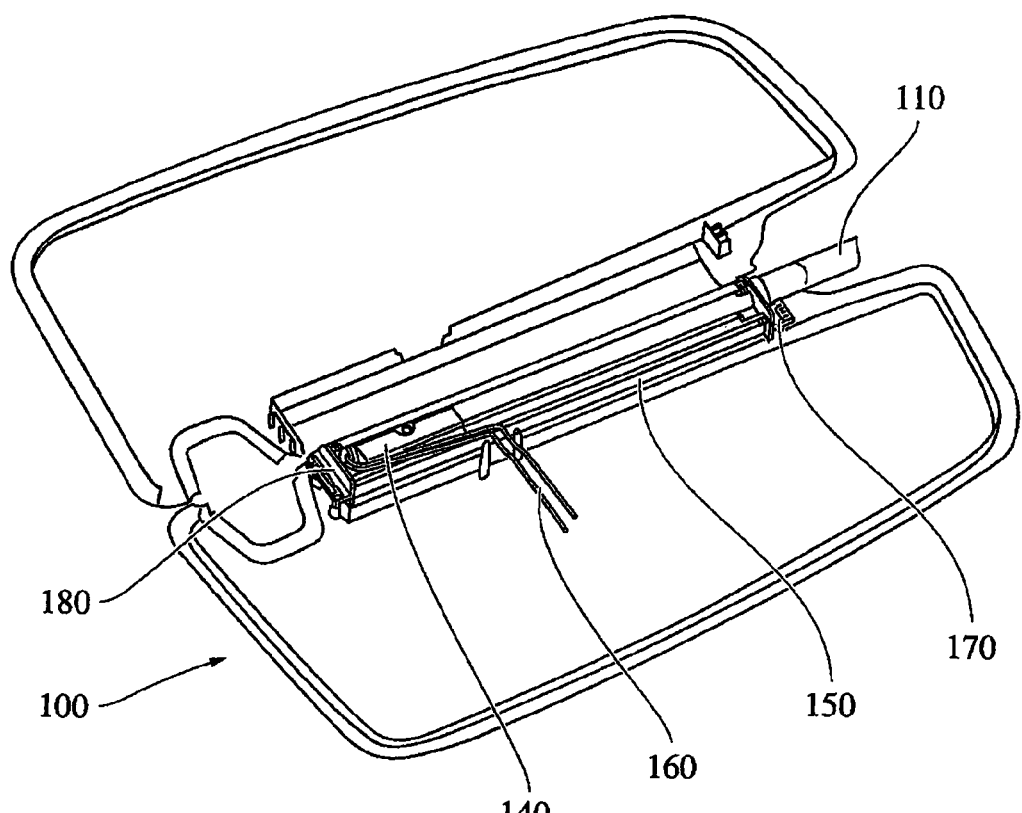
FIG. 10 is a perspective view of an exemplary embodiment of a visor with the mechanism of FIG. 9 installed therein according to this invention.

FIG. 10 illustrates the installation of the channel 150 and other components in an exemplary visor 100. The channel 150 engages the interior of the visor 100 and may be fixedly attached thereto. The visor is closed over the channel 150 and sealed.

In various exemplary embodiments, as illustrated in FIG. 11, the cross-section of the pivot rod 110 is approximately circular. In other exemplary embodiments, other symmetrical or asymmetrical shapes may be used.

In various exemplary embodiments, as shown in FIG. 11, the mechanism that allows the visor 100 to slide relative to the pivot rod 110 and to rotate about the pivot rod 110 includes a detent spring assembly 130 attached to the pivot rod 110, and positioned around the carrier 140. The detent spring assembly 130 provides compressive force on the pivot rod 110. The detent spring assembly 130 rotates or pivots relative to the pivot rod 110, permitting the visor 100 to be moved between the stowed and the in use positions. The force on the pivot rod 110 provided by the detent spring assembly 130 resists rotation, particularly in the detent position. As shown in FIGS. 11 and 12, the carrier 140 fits into a channel 150 that is coupled to the visor 100 body. In various exemplary embodiments, the carrier 140 slides along the channel 150, allowing the visor 100 to slide relative to the pivot rod 110. In some exemplary embodiments, the carrier 140 is force fit into the channel 150 allowing the channel 150 to flex and provide a means to reduce or eliminate looseness in the system. In some exemplary embodiments, the carrier 140 has appendages 142 or a separate added spring 141 that flexes inside of channel 150, providing a means to reduce or eliminate looseness in the system.

FIG. 13 shows an exemplary embodiment of a visor 100. The pivot rod 110 is attached to a detent spring assembly 130 and is fitted to the carrier 140. The carrier 140 slides along channel 150.

In various embodiments, the channel 150 may take a variety of shapes. FIGS. 14-21 illustrate some of the various shapes that the channel 150 and carrier 140 may take. In some exemplary embodiments, the channel 150 is not fully enclosed around its circumference, although the open portion may be very small. In various exemplary embodiments, the carrier 140 has an external shape that is similar to, but not necessarily identical to, the interior shape of the channel 150. The pieces are generally shaped such that they fit together, allowing the carrier 140 to slide along the length of the channel 150 without permitting appreciable movement in any other directions.

As shown in FIG. 14, in various exemplary embodiments, the channel 150 is not fully enclosed. This channel 150 has a basic C-shaped profile. This embodiment also has a channel cross section with angled surfaces. The angled corners on the top allow the channel to fit into the top of the visor's rounded shape. The lower angled surfaces reduce side movement of the carrier during rotation. These angled surfaces can be rounded and provide the same function. Traditional extrusion methods produce a rounded top and flat bottom creating a "D" shaped cross section, which can also be the formed of a channel according to this invention.

FIG. 15 shows another embodiment of a channel 150 and carrier 140. The channel 150 is shaped to create a tight fit between the channel 150 and carrier 140. Referring to FIG. 5, in various exemplary embodiments, the channel 150 has a shape adapted to contain at least a portion of the carrier 140 within the channel 150 and retain the carrier 140 in the channel 150 against force pulling the carrier 140 away from the channel 150. In various embodiments, the channel 150 may or may not be symmetrical across a given axis. FIG. 16 illustrates a third embodiment of a channel. V-shaped retaining bends 155 are positioned to either side of an open space. FIG. 17 shows another embodiment with V-shaped retaining bends 155. In FIG. 18, the channel is shown with retaining bends 155. FIG. 19 illustrates another embodiment of a channel 150 with another embodiment of a retaining bend 155. FIG. 20 illustrates one embodiment of a carrier 140 adapted to work with a channel 150 such as the channel shown in FIG. 18.

Conventional C-shaped channels can flex and bend when the visor is rotated about the pivot rod, which causes the channel to open potentially allowing it to separate from the carrier. FIGS. 15-19 and 21 reduce or eliminate this problem with cross-sections having a shape that creates a force vector, during rotation, which forces the channel to close rather than open. This closing of the channel also reduces carrier movement and noise during rotation.

FIGS. 22 and 23 illustrate closed cross-section channels. In various exemplary embodiments, a closed channel may be manufactured by, for example, combining a toggle.lock (see FIG. 22) or a hem (see FIG. 23) with a stamped or roll-form process. Other examples of closed cross sections can created by extruding, welding, riveting, adhesive, or other similar processes of joining materials.

Frequently, visors include illuminated vanity mirrors and/or powered accessories, such as garage door opener transmitters, memo recorders, or other electrical accessories. Power to such accessories is typically provided via one or more wires that run into the vanity inside the visor pivot rod and channel. This requires a sufficient length of wires to reach the end of the channel and back to the one or more electrical accessories when the visor is fully extended, which is a significantly longer distance than a direct route.

In some exemplary embodiments, as exemplified by FIG. 24, the selected shapes for the carrier 140 and the channel 150 are such that the selected shapes facilitate passage of one or more wire 160 between the interior of the carrier 140 and the visor 100. Unlike other visor designs, the wire(s) 160 need not be long enough to extend the length of the pivot rod 110 plus the channel 150 (as when the visor is slid out to its full capacity). Instead, the wire(s) 160, which typically runs into the visor 100 through the interior of the pivot rod 110, may exit the pivot rod 110 at any preselected point either within the carrier 140 or at the end of the pivot rod 110 and pass through the opening in the channel 150 to the visor 100 core. In some exemplary embodiments, the wire(s) 160 exits the visor pivot rod 110. Thus, the wire(s) 160 can be designed so that it is not affected by the movement of the visor 100 relative to the pivot rod 110 (or, in other words, by the movement of the carrier 140 relative to the channel 150).

Referring to FIGS. 25-28, the channel 150 and the visor core 101 (one half of visor core not shown) include a variety of attachment devices. The visor core 101 may include ribs 103 that impart structural strength. The channel 150 may be attached to the ribs 130. One or more protrusions or hooks 102 may extend from the ribs 103 or other portions of the visor core 101. The channel 150 may include tabs or flanges 151 that attach to the ribs 103 or hooks 102. The channel 150 may also include openings such as a slot or hole 153. A hook 102 or other feature of the visor core 101 may attach to the slot or hole 153. Referring to FIG. 26, the channel 150 may include an indentation or channel 154 that creates a tighter fit between the carrier 140 and the channel 150.

Figure 29:
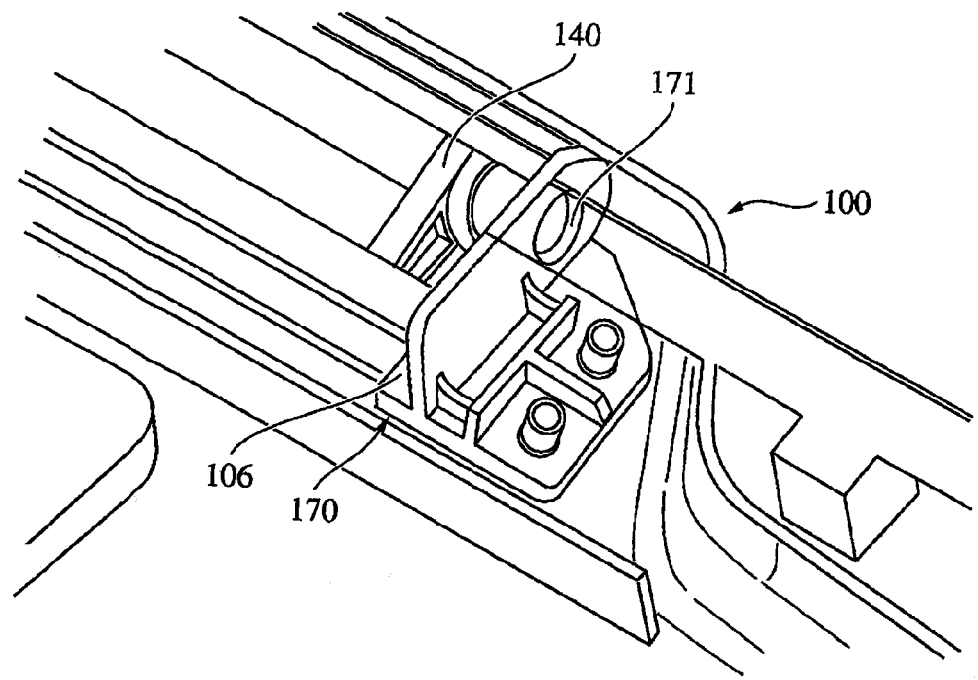
FIG. 29 is a perspective view of an exemplary embodiment of an outside end cap according to an exemplary embodiment according to this invention.
Figure 30:
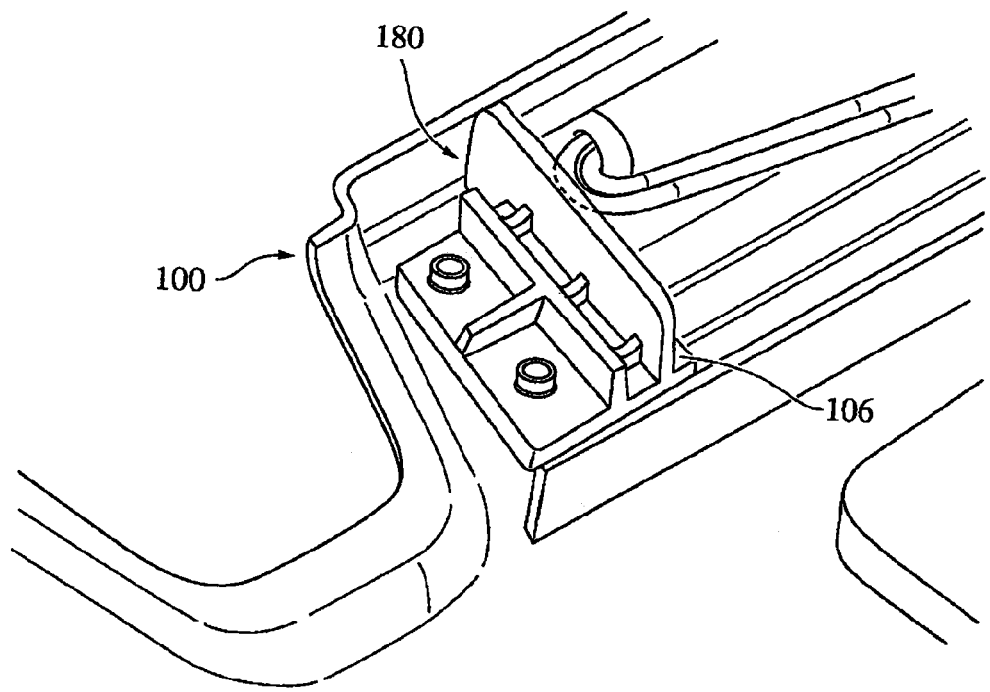
FIG. 30 is a perspective view of an exemplary embodiment of an inside end cap according to this invention.

Referring now to FIGS. 29 and 30, the visor 100 is attached to an outside end cap 170 and an inside end cap 180. In various embodiments, the outside end cap 170 and the inside end cap 180 are each attached to the channel 150 (not shown) with a friction fit. Also, holes may be added to the ends of the channel into which the end caps may snap or tab. The end caps may rigidly attach to the channel with other conventional means such as heat stakes, screws, insert molding, adhesive bond, and/or the like. That is, ends of the channel 150 are inserted into and mate with the outside end cap 170 and the inside end cap 180. FIG. 29 shows one exemplary embodiment of an outside end cap 170. The pivot rod 110 passes through a guide 171 in the outside end cap 170. FIG. 30 shows one exemplary embodiment of an inside end cap 180. The end caps 170 and 180 help keep the carrier assembly 190 coupled to the channel 150 and help define the limits of the ability of the visor 100 to move relative to the pivot rod 110. The outside end cap 170 and the inside end cap 180 are attached to the visor 100. This may be accomplished in various ways, including for example, screws, rivets, heat stakes, and the like.

Figure 31:
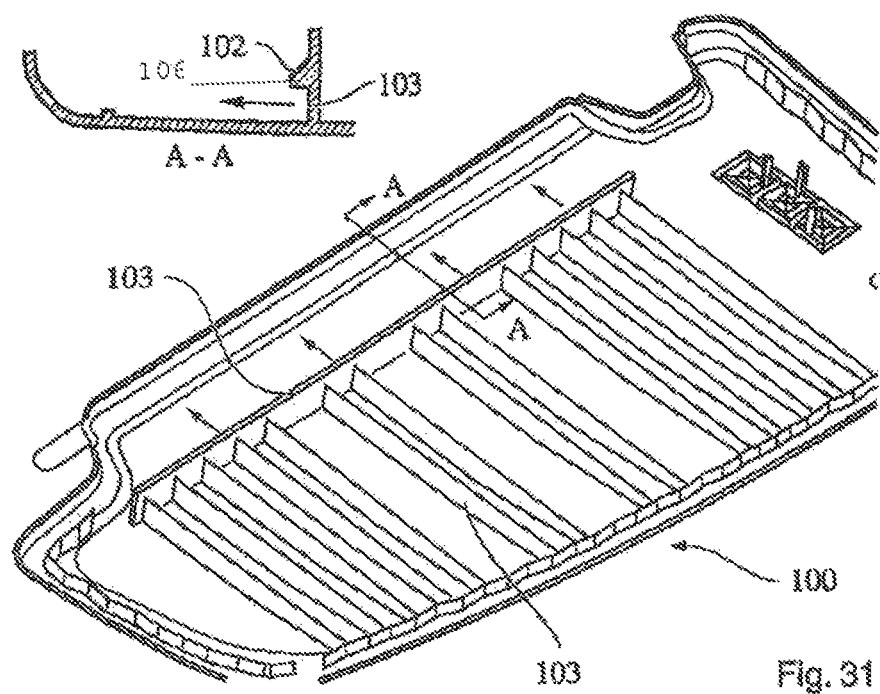
FIG. 31 is a partial perspective view of a first exemplary embodiment of a visor body according to this invention.

FIG. 31 shows a cross-section of a first exemplary embodiment of a visor 100 having multiple parallel ribs 103 and a single rib 103 that is perpendicular to and connected to the parallel ribs 103. In the exemplary embodiment shown in FIG. 31, the single rib 103 has a narrow projection 102 down its length extending from the side of the attachment rib 103 opposite the parallel ribs 103. The narrow projection 102 may be supported by one or more polygonal gussets 106. The narrow projection 102 may be used to directly attach the rib 103 to the channel 150 or attach the rib 103 via a flange 151 (FIG. 25) on the channel 150. This attachment may also be made, for example, by friction fit under the projection, by bonding, by fasteners, and/or the like.

Figure 32:
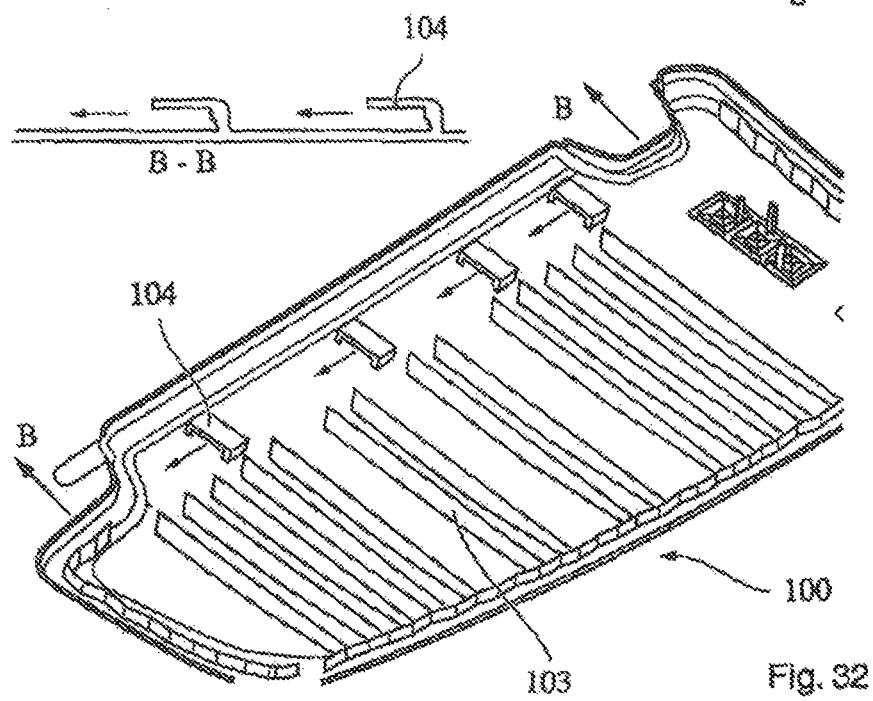
FIG. 32 is a partial perspective view of a second exemplary embodiment of a visor body according to this invention.

FIG. 32 shows a cross-section of another visor 100 with multiple parallel ribs 103 and four further hooks 104. The further hooks 104 are connected to a side of the visor 100 and have two sides and a top defining a slot that opens on two ends. The channel 150 may be attached to the visor 100 via the further hooks 104. This may be accomplished, for example, with tabs fitted into the slots, which may be secured by additional fastening mechanisms, such as, for example, friction fit, adhesives, fasteners, etc. Further, the further hooks 104 may be replaced with similar features formed by the visor core 100 tooling through holes in visor core 100. The number of and location of the further hooks can be varied.

Prior art channels for SOR visors have typically had an enclosed shape and been made of aluminum extrusions or channels having multiple pieces. In various embodiments, a channel 150 according to this invention is open rather than enclosed. In various embodiments, the channel is made of metal, but may be made of other materials of sufficient strength and durability to function as described above. In various embodiments, the metal channel 150 is roll formed. In various exemplary embodiments, the channel 150 is formed by roll-forming a sheet of material. Alternative embodiments may be formed by other means. For example, the channel 150 may be formed by molding and/or extruding a polymer. Other embodiments may be manufactured by processes such as stamping or thin wall extrusion.

According to various exemplary embodiments, the carrier may be preloaded in the channel to allow for larger tolerances and still have a tight fit. The channel opening "grips" the carrier and provides slide resistance as well as noise reduction throughout rotation and slide movement.

According to various exemplary embodiments, the channel has angled surfaces that restrict carrier movement in the channel and act as a damper when motion does occur. Angled surfaces may be applied to any channel design, whether open or closed, or manufacturing processes, such as, for example, extruded, roll-formed, or stamped.

It should be noted that references to relative positions (e.g., "top" and "bottom") in this description are merely used to identify various elements as are oriented in the figures. It should be recognized that the orientation of particular components may vary greatly depending on the application in which they are used.

For the purpose of this disclosure, the terms "coupled" and/or "attached" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

It is also important to note that the construction and arrangement of the elements of visor as shown in the exemplary embodiments is illustrative only. Although only a few exemplary embodiments according to this invention have been described in detail, it should be readily appreciated that many modifications are possible (e.g., variations in size, dimension, structure, shape, and proportion of the various elements; values of parameters; mounting arrangements; use or choice of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, and/or the nature or number of adjustment positions provided between the elements may be varied (e.g., by variations in the number of engagement slots or size of the engagement slots or type of engagement). It should be noted that the elements and/or assemblies of the system may be constructed from any of a wide variety of colors, textures, and combinations. Accordingly, all such modifications are intended to be within the scope of the present disclosure. Other substitutions, modifications, changes, or omissions may be made in the design, operating conditions, and arrangement of the preferred and other exemplary embodiments without departing from the spirit of the present disclosure.

Figure 33:
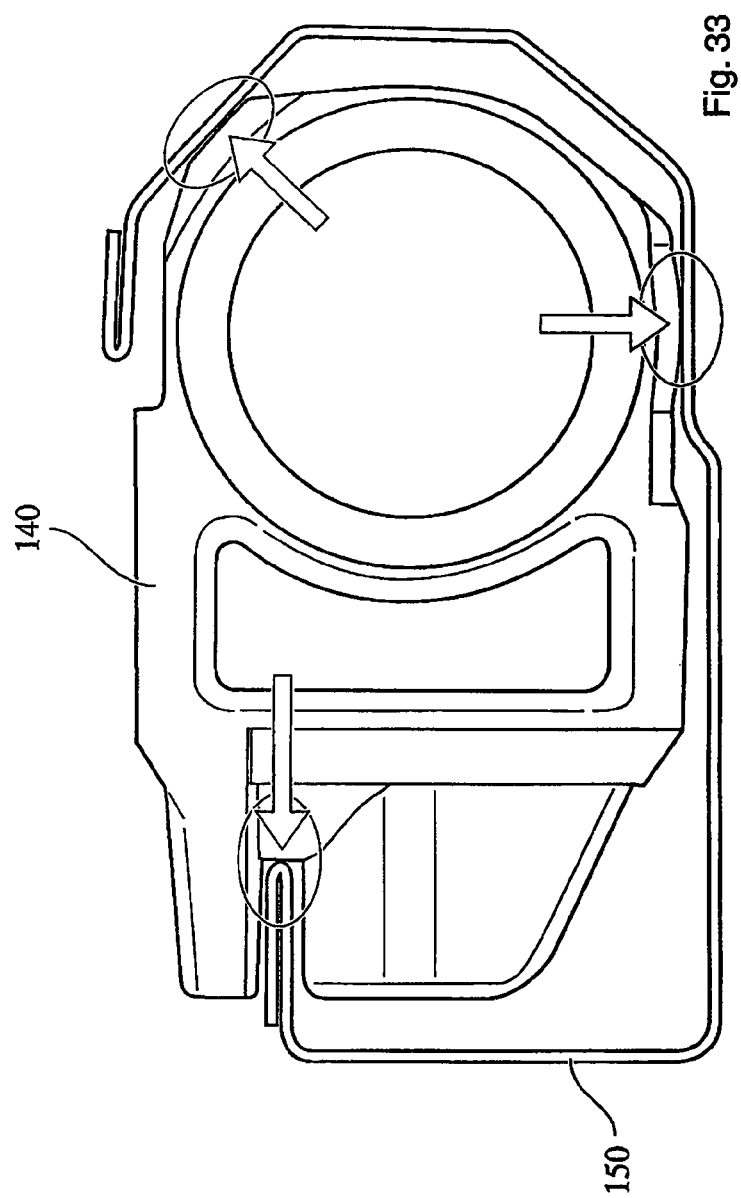
FIG. 33 shows the hemmed edge carrier fit

FIG. 33 shows the carrier 140 inside the channel 150. The edges of the channel are deflected in order to avoid sharp edges. One of the deflected edges is inserted into a groove, in the carrier. This optimizes the guidance of the carrier during its movement in the channel. Furthermore, the channel is slightly smaller than the carrier, so that the channel is, in defined regions, which are identified by arrows, pressed against the carrier.

Figure 34:
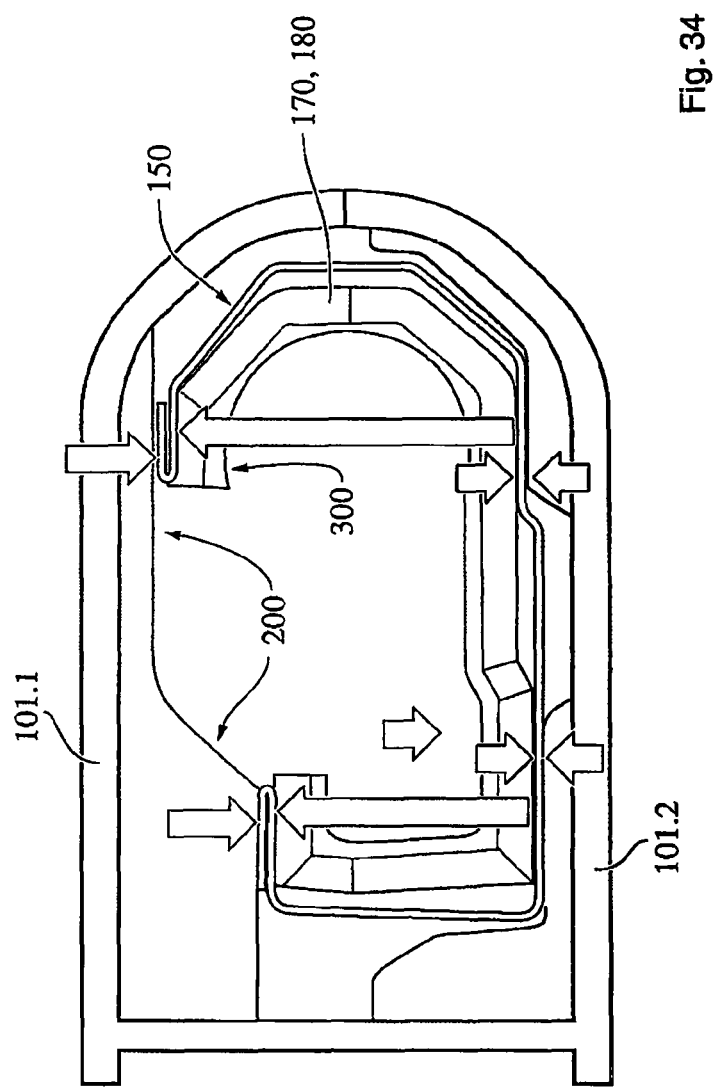
FIG. 34 shows the end caps in the channel

FIG. 34 depicts the visor core, which is made of two parts 101.1 and 101.2, which are sealed together. Both parts comprise rips 200, which are, preferably arranged perpendicular to the channel and which fix the channel inside the core. As can also be seen from FIG. 34, in the end region of the channel, end caps are inserted into the channel. The wedges 300 of the end caps open the channel ends.

The invention claimed is:

1. A vehicle visor comprising a hollow visor pivot rod, a carrier fitting to the visor pivot rod and a spring mechanism, characterized in, that the spring mechanism is at least partially in the carrier and the vehicle visor comprises a channel, whereas the carrier slides along the channel, wherein wires pass through the pivot rod and exit through an open side of the channel.

2. A vehicle visor according to claim 1, characterized in that the channel is fixed to the main body of the visor either directly or through the use of end caps, whereas the carrier is attached to the pivot rod with the spring mechanism.

3. A vehicle visor according to claim 1, characterized in that the spring mechanism comprises a detent spring assembly, which provides a compressive force on the pivot rod.

4. A vehicle visor according to claim 3, characterized in, that the detent spring rotates or pivots relative to the pivot rod.

5. A vehicle visor according to claim 1, characterized in that the cross-section of the carrier is larger than the cross-section of the channel.

6. A vehicle visor according to claim 5, characterized in that the carrier fits inside the channel with some interference that generates a resistive slide force.

7. A vehicle visor according to claim 1, characterized in that the carrier has a slot that engages an edge of the channel, reducing rotational movement in the channel.

8. A vehicle visor according to claim 1, characterized in that the carrier has appendages or a separate added spring that flexes inside the channel.

9. A vehicle visor according to claim 7, wherein the Slot has angled walls to keep the edge of the channel centered in the slot.

10. A vehicle, e visor according to claim 1 characterized at en d stops are provided for the mounting of the carrier.

11. A vehicle visor according to claim 10, characterized in that the end-stops are the end caps.

12. A vehicle visor according to claim 11, characterized in that the end caps provide end surfaces for ends of the channel.

13. A vehicle visor according to claim 1, characterized in that it comprises a visor core, which comprises two parts, which are connected.

14. A vehicle visor according to claim 13, characterized in that the pivot rod, the channel, or the wire are held in place by the visor core after the parts have been connected.

15. A vehicle visor comprising solid or hollow visor pivot rod, a carrier fitting to the visor pivot rod and a spring mechanism, characterized in, that the spring mechanism is at least partially in the carrier and the vehicle visor comprises a channel, whereas the carrier slides along the channel, wherein the channel has more than one edge and at least one of the edges of the channel is rounded, and the carrier has a slot that fits over a hemmed or rounded edge of the channel.

16. vehicle visor according to claim 13, wherein the two parts of the visor core are sealed together.

17. A v hide visor according to claim 15, characterized in that the char has more than one edge and at least one of the edges of the channel is rounded and hemmed back over itself or rounded in order to avoid sharp edges in contact with carrier.

* * * * *